June 27, 1933.  J. P. FISHER ET AL  1,915,987
METHOD OF CLEANING GAS
Filed Aug. 6, 1930  2 Sheets-Sheet 2
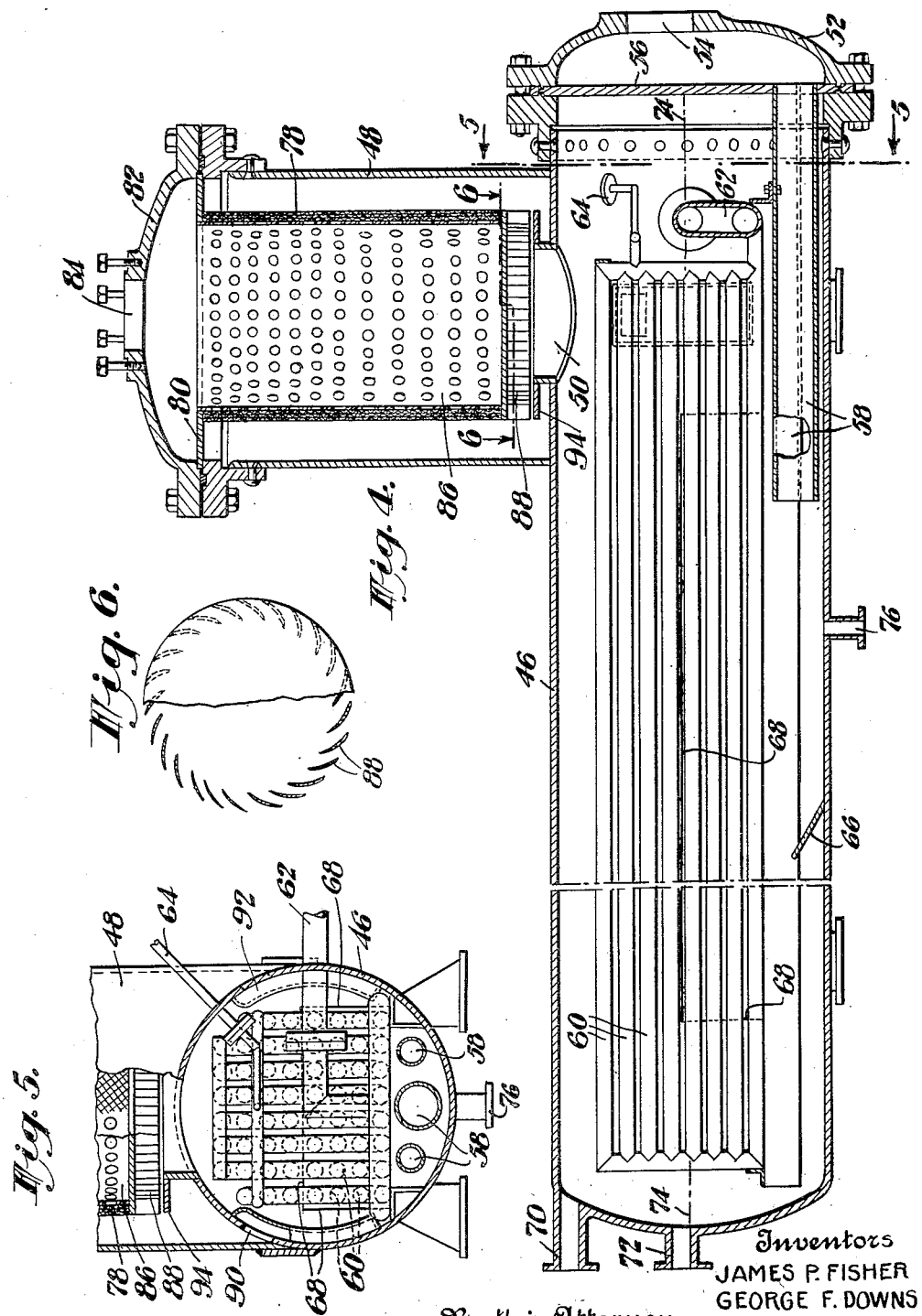
Inventors
JAMES P. FISHER
GEORGE F. DOWNS
By their Attorney
Edmund G Borden Patented June 27, 1933

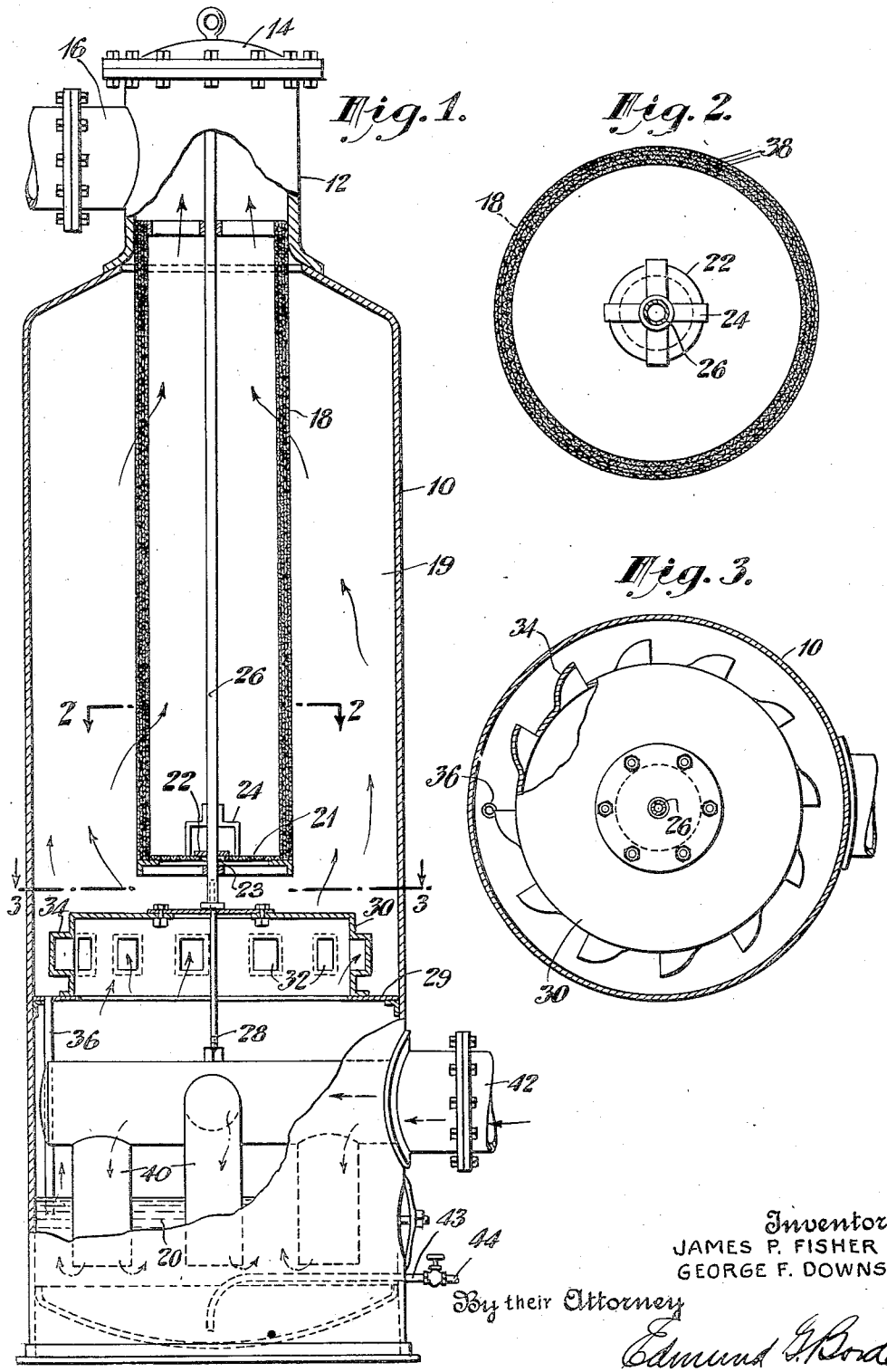

1,915,987

UNITED STATES PATENT OFFICE

JAMES P. FISHER AND GEORGE F. DOWNS, OF BARTLESVILLE, OKLAHOMA, ASSIGNORS TO EMPIRE OIL & REFINING COMPANY, OF DOVER, DELAWARE, A CORPORATION OF DELAWARE

METHOD OF CLEANING GAS

Application filed August 6, 1930. Serial No. 473,480.

This invention relates to an improved method for cleaning gas. This application is a continuation in part of our pending application S. N. 197,791; filed June 10th, 1927, which has matured into Patent No. 1,824,713, Sept. 22, 1931.

One of the common methods of removing dust from gas is to pass the gas through a liquid such as mineral seal oil. While most of the dust is removed from the gas by such treatment, the scrubbed gas becomes laden with oil mist which on entering the gas lines with the gas causes a good deal of trouble by depositing throughout the lines and meters and valves and like equipment.

One of the main objects of this invention is to provide a method for effectually relieving mist-laden gas of its mist before it passes to the gas distributing lines or mains.

In accordance with this invention the mist-laden gas is introduced into an annular chamber between a tubular gas-permeable screen and a surrounding holder in such a manner that the gas is given a rotary motion about the screen whereby the heavier particles of mist are caused to impinge against and coalesce on the walls of the holder and the finer particles of mist are caused to coalesce on the walls of the screen as the gas passes therethrough on its way to the outlet from the holder.

For a more complete understanding of the invention, reference is made to the appended claim wherein the various features of novelty are set forth and to the detailed description thereof in connection with the accompanying drawings forming part of this specification.

Referring to the drawings wherein the preferred form of apparatus for practicing the invention is shown:

Fig. 1 is a vertical section through the preferred form of gas cleaning apparatus some parts being in elevation;

Fig. 2 is a transverse cross-section on line 2—2 of Fig. 1 showing on an enlarged scale, the preferred structural features of the tubular screen which forms one of the important elements of the invention;

Fig. 3 is a vertical cross-section on line 3—3 of Fig. 1 with parts broken away, showing the preferred form of means for rotatably introducing the gas into that portion of the apparatus occupied by the tubular screen;

Fig. 4 is a vertical sectional view of a modification of the preferred form of gas cleaning apparatus according to the present invention;

Fig. 5 is a transverse cross-section on line 5—5 of Fig. 4 with parts broken away to show the relation of the horizontal and vertical portions of the apparatus; and Fig. 6 is a more or less diagrammatic cross-section on line 6—6 of Fig. 4 showing the preferred form of means for tangentially introducing the gas into the vertical portion of the apparatus.

As already briefly indicated the dust laden gas is first scrubbed with a liquid, preferably oil, to remove as completely as possible the dust in suspension in the gas. For convenience of description the gas thus scrubbed will be termed wet or mist-laden gas because it carries mist from the scrubbing liquid in suspension. The apparatus for removing the mist from the wet or scrubbed gas will first be described.

In the preferred form of apparatus for practicing the invention there is provided a cylindrical tank or holder 10 having a relatively restricted neck 12 which is capped by a removable cover 14. Communicating with the neck is a conduit 16 through which the finally cleaned gas passes out of the apparatus to the distributing gas lines. Depending from the neck of the casing is a tubular gas-permeable screen 18 which is of considerably less external diameter than the internal diameter of the holder 10 whereby there is provided an annular space 19 between the screen and holder. The top of the screen is preferably open so as not to restrict the free flow of gas from the screen. As regards the lower end of the screen it is optional whether it be open or closed or if it be closed whether the closure be permeable or non-permeable to gas for reasons which will more fully appear hereinafter.

The bottom of tank 10 is adapted to contain a body of liquid 20 through which the dust-laden gas is initially passed to relieve it of dust. The dust-laden gas is introduced into the liquid below the top level thereof by means of a plurality of downcomer pipes 40 which lead from a supply main 42. Extending across the casing below the screen is a device which serves, generally speaking, as a partition for dividing the casing into upper and lower compartments. As shown in the drawings this device comprises an inwardly extending flange 29 on which is supported a hood-like member 30 having a series of openings 32 extending through its side walls whereby the wet gas below the partition may pass therethrough and thereabove. These openings 32 communicate with suitable nozzles 34 annularly disposed around the hood 30 in such a manner that the gas passing therethrough enters the annular space 19 with a rotary movement around the screen whereby the heavier particles of mist are caused to impinge against and coalesce on the walls of the holder and from which they flow back to the main body of liquid as will be presently explained.

Referring now more particularly to the closure at the bottom of the screen 18, it has been demonstrated that when the apparatus is functioning properly there is no appreciable tendency for the gas to enter the screen from below, the tendency of the gas being rather to move away from that end of the screen and pass upwardly. It is, however, deemed preferable to provide a suitable closure in practical working apparatus. As shown, the closure preferably consists of a screen-disk 21 which is provided with a central opening 23 which is normally kept closed by a plate-like valve 22. This valve is so arranged that it will move upwardly to uncover the opening to permit free passage of gas therethrough for direct passage to the outlet 16 at the top of the holder in case excessive pressure should develop within the holder from one cause or another. The valve 22 is preferably confined within a cage 24 secured to the framework of the screen. Passing through and secured to the cage is a rod 26 which extends axially through the screen. The lower end of the rod is centered on a suitable member 28 fixed in the axis of the casing in any suitable manner and thus serves to hold the screen properly positioned within the holder. By removing the cap 14 and pulling upwardly on the rod the screen may be withdrawn from the holder.

It is prefered to make the screen 18 of a plurality of layers 38 of screen in order to provide numerous wires to which the mist in the gas may cling as the gas passes through the walls of the screen. The mist after coalescing on the screen wires and on the walls of the holder flows down by gravity and finally reaches the partition flange 29 from whence it passes through pipes 36 into the main body of the liquid 21 below the normal liquid level thereof, it being understood that the pipes 36 extend below the normal liquid level in order to form a liquid seal against the upward passage of gas.

Dust and dirt which accumulate in the body of liquid or oil may be blown out of the tank through a blow-off pipe 43 by opening the valve 44 therein.

The operation of the above described apparatus will now be briefly set forth. The dust-laden gas is initially scrubbed by the liquid in the bottom of the tank and most of the dust thus removed. Due to the violent agitation of the liquid caused by introducing gas under pressure thereinto a spray or mist is formed which is taken up by the emerging gas. The wet or mist-laden gas in passing through the nozzles 34 in the partition is given a rotary motion about the screen with the result that the heavier droplets or particles of oil mist are caused to impinge against and coalesce on the walls of the holder down the sides of which they flow and finally pass to the liquid at the bottom of the tank by way of the drain pipes 36. The last traces of mist are removed from the gas as it passes through the walls of the screen on its way to the outlet 16. The finer droplets of mist in contacting with the wires of the screen cause the screen to become wet and due to surface tension phenomena the mist tends to adhere to the wires of the screen and flow downwardly by gravity rather than to remain in suspension in the gas during its passage through the screen. As the oil accumulates on the screen it flows downwardly toward the bottom of the screen as already stated and in so doing washes the screen free of any dust which may be deposited therein. The screen is therefore self-cleaning and is automatically maintained in operative condition at all times. The oil which flows down the screen finally reaches the bottom of the tank through the conduits 36 which as already stated, extend downwardly from the top of the partition flange 29. Notwithstanding the fact that the gas on entering the annular chamber 19 is given a rotary motion, it is found from practical experience that there is very little or no appreciable swirling of the gas within the screen. Consequently the gas flows quietly into the discharge main 16 at the top of the tank.

In the modified form of the apparatus that is shown in Figs. 4 and 5, there is provided a horizontal positioned cylindrical refrigerating tank 46. Superposed upon the tank 46, preferably near one end thereof, is a vertically positioned cylindrical chamber 48 communicating with the refrigerating tank by means of an opening 50 through which mist-laden gases from the refrigerating chamber are led into the chamber 48 to be finally purified.

The apparatus shown in Figs. 4 and 5 is particularly designed and adapted for use in removing from gas liquids carried by the gas in the form of vapor separable from the gas most rapidly by contacting the vapor laden gas with a refrigerated liquid solvent and condensing agent.

At one end of the horizontal tank 46 is a removable cover 52 facilitating cleaning out the tank and in which is an opening 54 for the introduction of the gas which is to be devaporized according to the present invention. This opening 54 is preferably offset above the center of the tank so as to be practically entirely above the normal liquid level 74 in the refrigerating tank so that if the apparatus is not in operation the liquid in the tank will not flow back through the opening 64 into the gas lines. Secured in place by the cover 52 is a header plate 56 through the lower portion of which extend inlet pipes 58 for the entrance of the vapor laden gas into tank 46. Enclosed within the refrigerating tank 46 is a system of refrigerating tubes 60 with an inlet pipe 62 and an outlet pipe 64 for any suitable refrigerating fluid that it may be desirable to use within the said tubes to cool the scrubbing liquid contained within the refrigerating tank which in turn acts to cool the entering gases and their content of impurities. At the bottom of the refrigerating tank is a baffle 66 bent at an obtuse angle so that the gas entering by pipes 58 will be diverted upwardly and will circulate around the refrigerating tubes 60 and not merely follow the inner surface of the tank to an exit. Extending horizontally between the refrigerating tubes and for but a part of the length of the said tubes is a baffle plate 68 the purpose of which is to aid in the thorough circulation around the pipes of the gas which has previously been diverted upwardly by the baffle 66.

The refrigerating tank 46 is provided at one end and near the top thereof with an inlet pipe 70 through which the scrubbing liquid is introduced into the tank. A suitable drain pipe 72 is provided so as to drain off the excess liquid that is accumulated by the removal of the entrained vapors and liquids in the entering gas. The condensing and purifying liquid is thus preferably kept at a substantially constant level as indicated at 74—74. At the bottom of the refrigerating tank is a drain pipe 76 which is for the purpose of removing from the tank the impurities which have been collected in the purification process and for draining the entire contents of the tank in case it is desired to clean the apparatus.

Referring now more particularly to the means for removing the mist from the mist-laden gas which is coming out of the tank 46 through the opening 50 into the vertical chamber 48 there is provided within the chamber 48 a tubular screen member 78. This screen member depends from a flange 80 which in turn is firmly secured by a removable cover 82 having a centrally located opening 84 therein for the exit of the finally purified gas. The preferable construction of the tubular screen member 78 is that of a plurality of layers of screen the innermost of which is a perforated metal plate 86. This construction greatly facilitates the removal of the mist from the mist-laden gases which pass through the walls of the screen and thence through opening 84.

Attached to the tubular screen member 78 and depending from the bottom thereof is a series of curved vanes 88 annularly arranged so as to direct the gas issuing through the opening 50 toward the outer walls of the chamber 48 and to give the gas thus directed a rotary movement around the screen. In so doing the heavy particles of mist in the gas are impinged against the walls of the chamber 48 and coalesce thereon from which walls they flow back to the refrigerating tank 46 as will next be explained.

The particles of mist which coalesce on the walls of the chamber 48 and the particles which cling to the screen member 78 will flow down by gravity thus cleaning the screen and walls of the apparatus of any dust or impurities which may have been carried this way and leave the chamber 48 by outlets 90 (Fig. 5), passing through the conduits 92 into the lower portion of the refrigerating tank 46.

The vanes 88 are spaced from a flange 94 of the opening 50 to a very slight degree but, since this space is very slight as compared to the spacing of the vanes 88, there is no appreciable ill effect on the efficiency of the apparatus.

The operation of the above described modification of the preferred apparatus for carrying out the process of the present invention will now be briefly described. The vapor laden gas, which may be under a pressure of one to 50 atmospheres or more, enters the apparatus through the opening 54 and passes through the inlet pipes 58 into the refrigerating tank 46. The scrubbing liquid is introduced into the chamber 46 through the inlet pipe 70 and is allowed to come to the normal liquid level 74—74. This scrubbing liquid, which is cooled by means of refrigerating tubes 60 through which a refrigerating fluid is flowing, will act to condense and/or dissolve any vapor in the impure gas and at the same time will remove the solid impurities from the gas. The gas entering through pipes 58 will be thoroughly circulated around the tank 46 by the baffles 66 and 68 as previously stated and will leave the refrigerating tank through the opening 50. The gas which has taken up scrubbing liquid from the refrigerating tank in the form of particles of mist will by reason of its velocity and by means of the vanes 88 be given a rotary motion and be thrown against the walls of the chamber 48 where the larger particles of mist are caused to impinge and coalesce thereon and then flow downward by gravity. The gas then flows through the tubular screen member 78 where the smaller particles of mist are removed and then flows out of the apparatus without substantial drop in pressure, through the opening 84. The liquid which has collected on the walls of the chamber 48 and on the screen member 78 will flow downwardly through the openings 90 and the conduits 92 into the scrubbing liquid in the refrigerating tank 46 as previously explained.

The apparatus above described is simple in construction and has been found to be admirably adapted for its intended purpose when operated in the manner specified. It will be readily appreciated that some changes in constructional features may be made without departing from the spirit of the invention.

What is claimed as new is:

A method of cleaning gas comprising, passing all of the gas downwardly into and upwardly in finely divided form through a body of scrubbing liquid to thereby remove solid particles from the gas, conducting the gas away from the liquid in a vertical path and thence directing it tangentially outward with a whirling motion into an annular space whereby heavier particles of entrained liquid carried by the gas are centrifugally separated therefrom, and again changing the path of the gas and passing it laterally inward through a screen to remove finely divided liquid particles therefrom.

In testimony whereof we affix our signatures.

JAMES P. FISHER.
GEORGE F. DOWNS.